Aug. 17, 1926.

H. W. SKINNER

PIPE HANGER

Filed July 25, 1921    2 Sheets-Sheet 1

1,596,317

Inventor;
Henry W. Skinner
By Foulk Bain Hinkle
Atty.

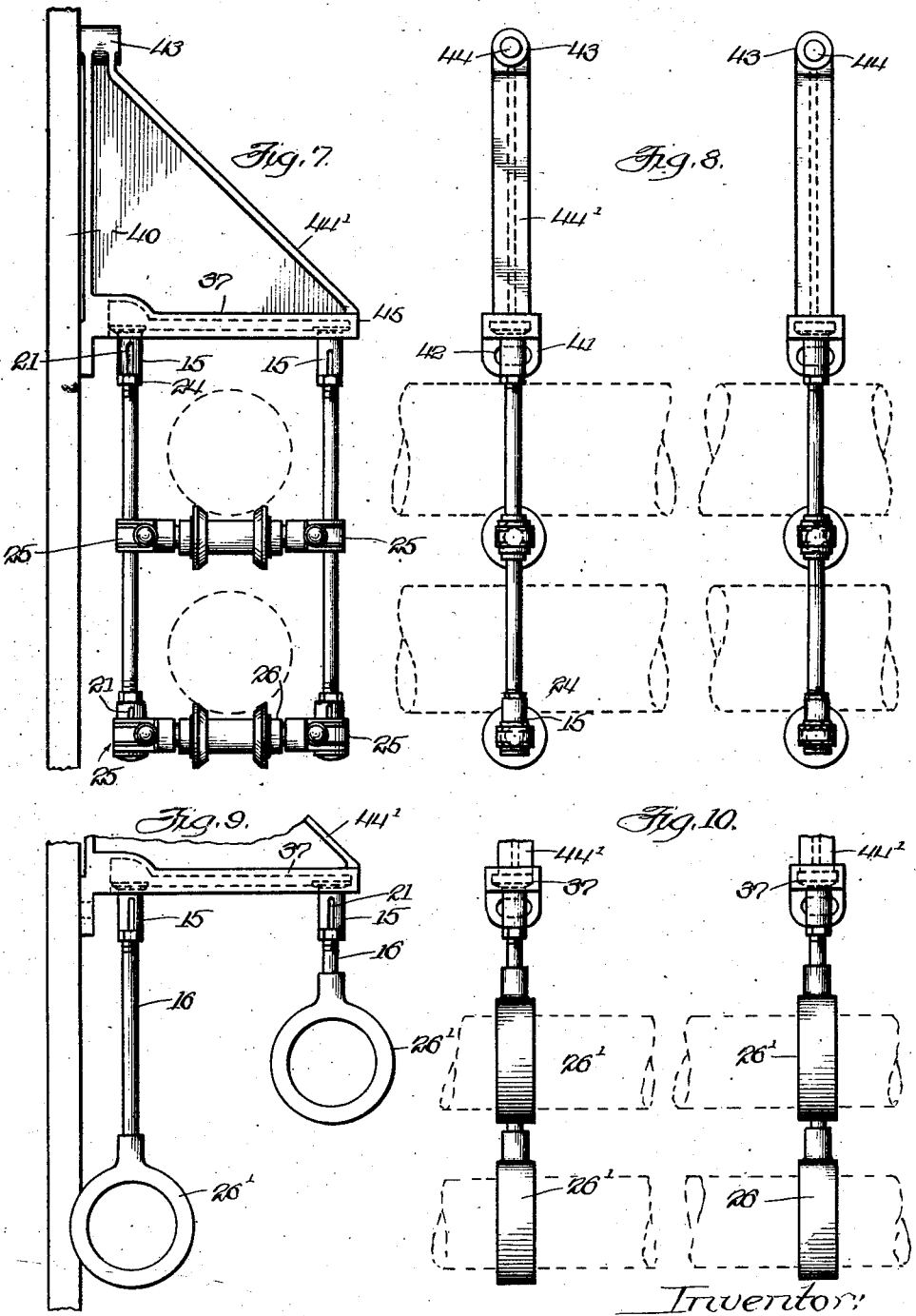

Patented Aug. 17, 1926.

1,596,317

UNITED STATES PATENT OFFICE.

HENRY W. SKINNER, OF WAUKEGAN, ILLINOIS.

PIPE HANGER.

Application filed July 25, 1921. Serial No. 487,414.

The invention relates to improvements in pipe hangers.

One of the objects of the invention is, generally, to improve pipe hangers.

Another object is to provide an adjustable fitting having one or more indicating apertures, or longitudinally extending slots, thru which to visually ascertain the position of the threaded rod or pipe adjustable therein, with respect to the fitting, operable for the purpose of raising or lowering either side of the pipe hanger structure.

Another object is to provide an improved housing or receptacle within which the fitting is insertable and by which it is supported.

Another object is to provide a fitting which may be adjustably attached to both ends of a vertical pipe supporting rod or pipe.

Other, further and more specific objects of the invention will become readily apparent, to persons skilled in the art, from a consideration of the following description when taken in conjunction with the drawings, wherein:—

Fig. 7 is an end elevation of another modification of said support.

Fig. 8 is a front elevation of Fig. 7.

Fig. 9 shows, in end elevation, substantially the same bracket or fitting support as that shown in Figs. 7 and 8, but shows different pipe hangers.

Fig. 10 is a front elevation of the structure shown in Fig. 9.

In all the views the same reference characters are employed to indicate similar parts.

In adjusting pipe hangers, in which a pair of rods or pipes are employed for supporting one or more fluid conducting pipes it often becomes necessary to adjust the altitude of the latter pipes at intermediate points where it is supported by particular hangers in order that the inclination of the conducting pipe may be uniform, that entrained water resulting from condensation of the steam, or other liquid, may flow in a desired direction and to avoid pockets or abnormally low portions in the pipe. Such adjustment is frequently required as a result of settling of a building, or the like, after the pipes conveying the fluid or liquid have been installed, and therefore, to be practical, every one of the pipe hangers must individually be capable of adjustment so that the supported pipe may be raised or lowered, as occasion may require.

Where two vertical pipes, or rods of a hanger, are cross connected by a transverse member for supporting one or more fluid conveying pipes it is quite essential that each of the vertical rods may independently be adjusted, and it is furthermore very desirable that the location of the end of the rod, in the fitting required for the adjustment, should at all times be seen or ascertained, so that the entire hanger may not inadvertently be disconnected and permit the conveying pipe to fall or to descend to any degree from its normal intended position of support.

It is quite convenient, also, to provide a pipe hanger fitting which may be used for vertical adjustment of the side supporting rods of the hanger without the necessity of disarranging any of the parts thereof and without removing the device as an active support for the pipe.

Figure 4:
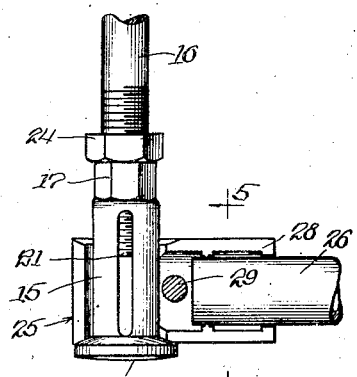
Fig. 4 is an elevation, showing part in section at the lower end of the vertical rod as it appears in Fig. 3.
Figure 5:
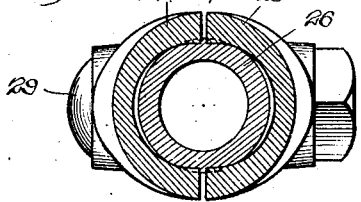
Fig. 5 is an enlarged transverse section taken on line 5—5 of Fig. 4.

In the drawings 15 is the improved universal fitting, or threaded sleeve, for engagement with the vertical side rods or pipes 16 of the pipe hanger. The fitting 15 is interiorly threaded for the rod or pipe 16, and is preferably provided on its lower end with a polygonal terminal 17, by which it may be bodily rotated by application of a wrench. The fitting 15 is provided with a cylindrical part 18 and a rounded head 19, spherically tapered as at 20. The cylindrical portion 18 is provided with one or more longitudinally extending slots 21 in the bore, thru which the side rod 16 may be seen. There may be two such slots, 21, opposite each other, so that the end 22 of the vertical rod 16 becomes clearly visible. When the ends 22 of the rods pass beyond the boundary of the slot 21, in either direction, the operator then knows that the rod 16 has been inserted in the fitting 15, as far as may be, or it has been withdrawn therefrom as far as safety will permit. The fitting 15 is adaptable for location on the top end of the rod 16, and also the bottom end of the rod 16 as more clearly shown in Fig. 4, in which event a check nut 24 may be used to more rigidly secure the fitting 15 to the rod 16. When the fitting 15 is employed at the lower end of the rod 16, the fitting 25, more clearly shown and described in my copending application Serial No. 462,873 filed April 20, 1921, for supporting a transverse rod or pipe 26, may be made to surround the lower end of the fitting, and the head 19 will prevent fitting 25 from leaving the fitting 15. In this particular case the members 27 and 28 of the fitting 25 are secured together by the transverse clamping bolt 29. The fitting 25 consists of the two clamping members 27 and 28, held together by the bolt 29 which is inserted between the fitting 15 and the end of the transverse pipe or rod 26, as more clearly shown in Fig. 4. The fitting 15 may be rotated by engagement of a wrench with the angular portion 17 thereof to raise or lower the transverse support 26. The nut 24 will prevent rotation of the rod 16 while the fitting 15 is being rotated for shortening or lengthening the effective lineal dimensions of either of the rods 16.

After the adjustment has been made at the upper end of the rod 16, by means of the fitting 15, the lower end of the rod and the fitting 15 may be correspondingly adjusted so as to still further increase or decrease the effective length of the structure. By providing a hanger of this character the fitting 15 is adaptable for use at both the top and bottom end of the rod 16, thus a very extended range of adjustment may be had and the expense of the structure decreased by the duplication of the parts in the respective positions.

Figure 1:
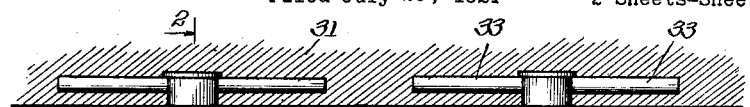
Fig. 1 is an end elevation of the hanger showing the fitting receptacle or insert support embedded in the cement overhead wall or floor.
Figure 2:
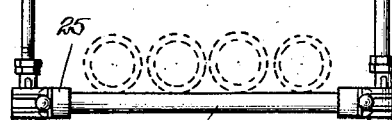
Fig. 2 is an enlarged cross section of the insert support or housing with the fitting therein.
Figure 2:
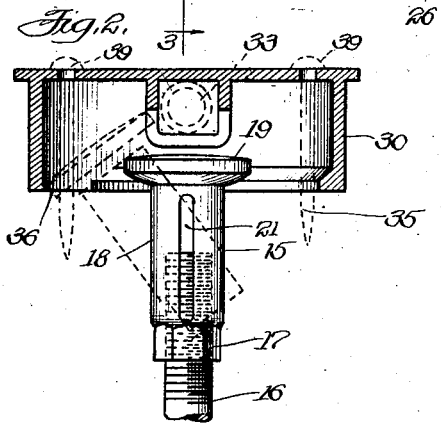
Figure 3:
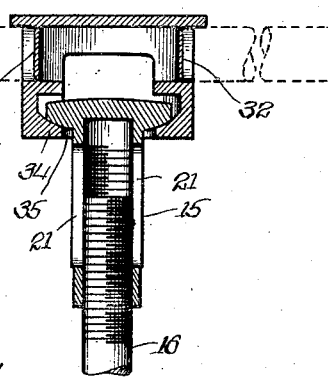
Fig. 3 is a transverse section taken on line 3—3 of Fig. 2.
Figure 6:
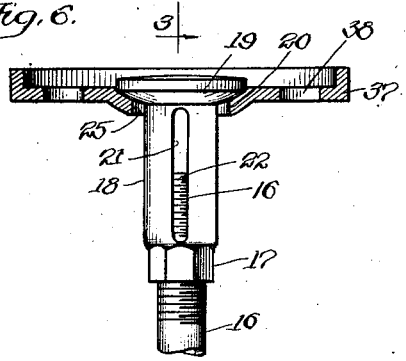
Fig. 6 is a modified form of the support and receptacle, or plate.

Another feature of the invention consists in the means for supporting the fitting 15 and the pendant rod 16 which consists of an insert or housing 30 for insertion in a cement wall 31. The housing is provided with knock-out closures 32 which may be knocked from the housing and a pipe 33 passed therethru for providing additional support for the housing in the cement structure. The lower wall 34 of the housing is slotted and spherically curved to receive the curved head 19 of the fitting 15 to render the fitting self-adjustable, so that it will always be in vertical alignment and curved at its top surface to facilitate its introduction in a holder, as at 35, to admit the cylindrical part 18, but to prevent the head 19 from passing therethru. At the end of the slot there is an opening 36 that permits the entrance of the head 19 only when the fitting is inclined from the vertical, as shown by dotted lines in Fig. 2, but which will not permit the fitting 15 to pass thru the slot when it is in vertical position, so that so long as there is suspended weight attached to the fitting 15 it cannot leave the housing 30.

The knock-out closures 32 prevent entrance of the cement into the housing 30 when the rod 33 is not used. Nails 39 may be passed thru the housing 30 to hold it to the form upon which the cement wall 31 is to be made.

Instead of using the insert or housing 30 when the hanger is to be suspended from an ordinary ceiling, the plate 37 may be employed which is provided with the same slot 35 and which may be secured to an overhead wall or ceiling by bolts that may pass thru the openings 38. In Figs. 7, 8, 9 and 10, I have shown the plate 37 in the form of a bracket when the hanging members are to be supported from a side wall 40. The inner lower end 41 may be slotted, as at 42, to provide for some lateral adjustment and the upper end 43 is provided with a perforation 44 thru which a bolt or screw may be passed to hold the bracket to the wall.

An angularly disposed member 44' is connected to the outer end of the plate 37 as at 45 and to the upper terminal end 43. In Figs. 7 and 8 the rods 16 suspended from the fittings 15 have fittings 25 fastened thereto. In Figs. 9 and 10 hangers 26' are suspended from the rods 16.

The fitting may be held in any sort of support, that engages the head of the fitting and which permits its rotation and permits automatic adjustment thereof to align itself vertically.

Having described my invention what I claim as new and desire to secure by Letters Patent, is:—

Pipe hangers comprising a pair of vertical members having threaded ends, a sleeve threaded on each of said ends and having slots therein, a polygonal portion and a swivel head, housings adapted to receive the heads of the upper sleeves for swiveling movement, clamping members adapted to be clamped around the lower sleeves and to be supported by the heads for relative swiveling movement and a transverse member joining said clamping members and adapted to support a plurality of pipes.

In testimony whereof I hereunto subscribe my name.

HENRY W. SKINNER.